United States Patent [19]
Carr et al.

[11] Patent Number: 5,644,924
[45] Date of Patent: Jul. 8, 1997

[54] VEHICLE ENGINE CONTROL FOR OPERATOR COMPARTMENT TEMPERATURE MAINTENANCE

[75] Inventors: Douglas E. Carr, Chillicothe; Thomas R. Sandborg, Mapleton, both of Ill.

[73] Assignee: Caterpillar Inc., Peoria, Ill.

[21] Appl. No.: 559,782

[22] Filed: Nov. 15, 1995

[51] Int. Cl.[6] .................................................. B60H 1/32
[52] U.S. Cl. ........................ 62/133; 62/126; 62/243; 62/323.1
[58] Field of Search ........................ 62/133, 125, 126, 62/127, 229, 243, 244, 323.1, 239, 160; 123/198 D, 179.3, 179.4, 179.1, 179.2

[56] References Cited

U.S. PATENT DOCUMENTS

| | | | |
|---|---|---|---|
| 4,200,080 | 4/1980 | Cook et al. | 123/179 B |
| 4,419,866 | 12/1983 | Howland | 62/323.1 X |
| 4,421,075 | 12/1983 | Mandel | 123/142.5 |
| 4,454,843 | 6/1984 | Uchida et al. | 123/179 B |
| 4,520,271 | 5/1985 | Goertler et al. | 298/38 |
| 4,534,326 | 8/1985 | Bowcott | 123/179 B |
| 4,563,987 | 1/1986 | Geary et al. | 123/179 B |
| 4,648,364 | 3/1987 | Wills | 123/198 |
| 4,878,465 | 11/1989 | Hanson et al. | 123/179 |
| 5,000,139 | 3/1991 | Wong | 123/779 B |
| 5,072,701 | 12/1991 | Khan et al. | 123/142.5 |
| 5,072,703 | 12/1991 | Sutton | 123/179.4 |
| 5,129,376 | 7/1992 | Parmley | 123/179.2 |
| 5,156,000 | 10/1992 | Mallofré | 60/612 |
| 5,186,015 | 2/1993 | Roehrich et al. | 62/133 |
| 5,222,469 | 6/1993 | Sutton | 123/198 |
| 5,275,011 | 1/1994 | Hanson et al. | 62/157 |
| 5,465,589 | 11/1995 | Bender et al. | 62/133 |

OTHER PUBLICATIONS

Detroit Diesel—Optimized Idle tm—Sales Literature—Est. 1995 –2 Pages.

*Primary Examiner*—Harry B. Tanner
*Attorney, Agent, or Firm*—Alvin J. Riddles

[57] ABSTRACT

A control system for the use of the main engine of a vehicle as a heat source in maintaining the temperature of an operator compartment. The system is manually enabled subject to multiple criteria, the temperature in the operator compartment is monitored, and signals for the desired operator compartment temperature within an about plus or minus 10 degrees control range are produced. The main engine of the vehicle is enabled to start and run by all standard safety features and with a fuel flow controlled idle power output. Cycling through the starting and stopping of the engine is accomplished in response only to the temperature monitor signals. Disconnect of the operator compartment temperature control is accomplished manually by the operator, usually by actuating the operator controls. The invention provides the added safety feature of focused operator attention at enablement; the added control feature of system hysteresis through the use of a temperature range to prevent over regulation and any added idling is only that needed for operator compartment temperature maintenance.

14 Claims, 1 Drawing Sheet

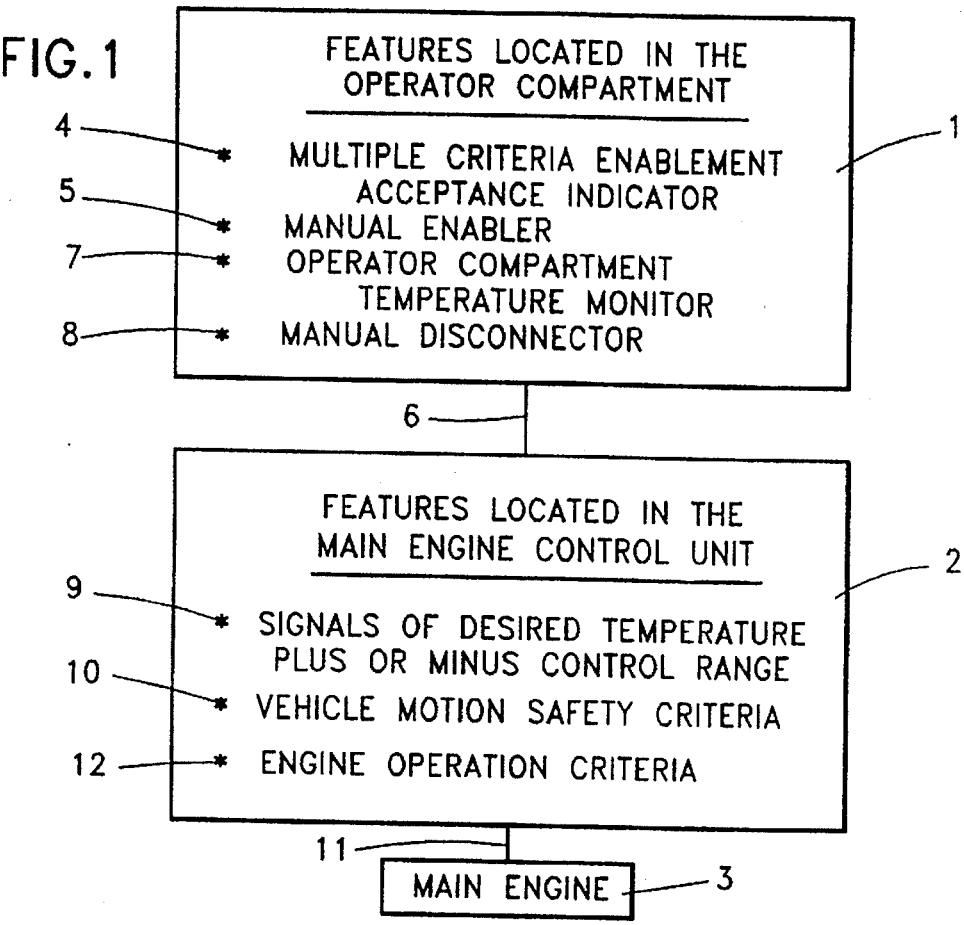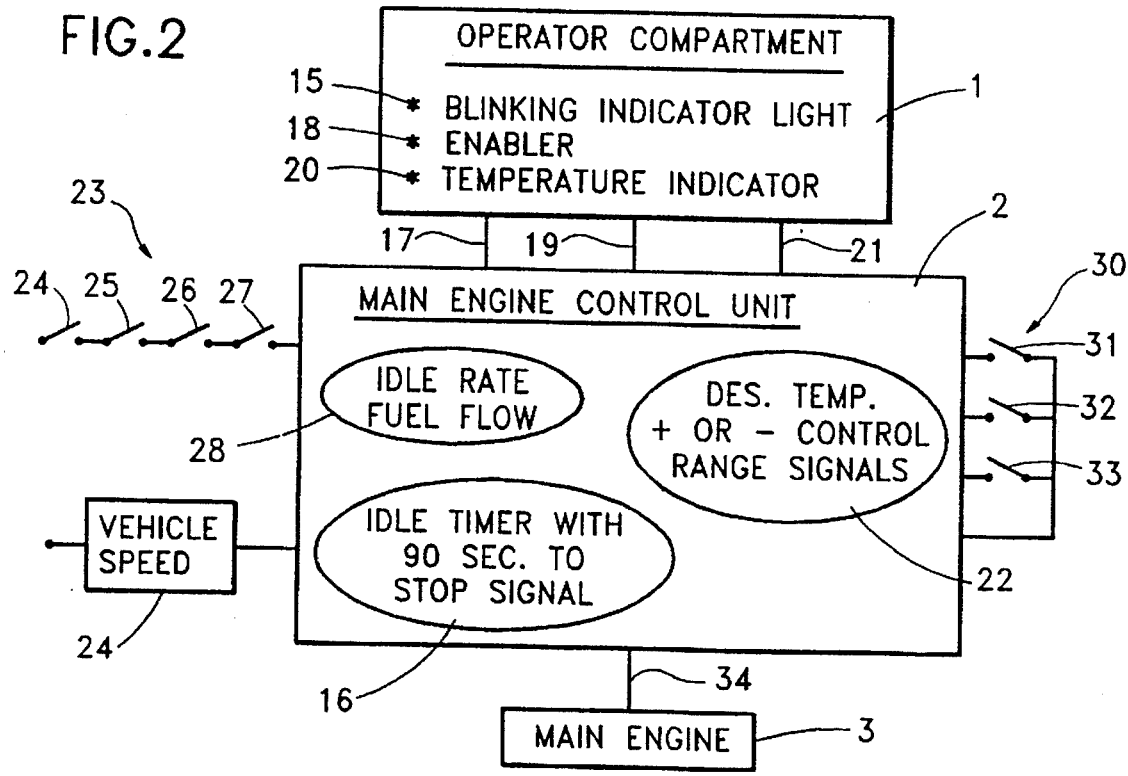

5,644,924

VEHICLE ENGINE CONTROL FOR OPERATOR COMPARTMENT TEMPERATURE MAINTENANCE

TECHNICAL FIELD

The invention relates to the control of the temperature in a vehicle operator compartment and in particular to the control of the main vehicle engine as an energy source for maintaining the vehicle operator compartment temperature in a comfortable range during periods of operator inattention, such as sleeping.

BACKGROUND ART

In the operation of vehicles that are in service for long periods, such as trucks, tradeoffs are encountered in the considerations involved in the controls provided when the main engine that provides the power for the movement of the vehicle is also to be used for the source of energy for the heating or cooling of the operator compartment. The limitations imposed by the environmental conditions of operation, the duration of the operation and the performance expected of the operator are at times difficult to accommodate together.

An example of the various considerations involved in the interrupting and restarting of a main vehicle engine is illustrated in U.S. Pat. No. 5,186,015. Adding to the types of considerations illustrated in U.S. Pat. No. 5,186,015 further considerations are encountered in providing for the control of the main engine where it is also to serve as an energy source for maintenance of the temperature of the operator compartment so that an operator is able to sleep in it for a normal period. Under such circumstances, additional safety considerations become involved due to the relatively prolonged period without operator attention.

In U.S. Pat. No. 5,072,703 a system is described that provides an operator compartment temperature monitoring function that is independent of operator involvement and participation. In the system of U.S. Pat. No. 5,072,703 there is a "pre start up" engine starting, running and stopping operation that is used to establish that there is a non-moving condition of the vehicle, in other words that the vehicle is parked, and some of the sub systems are enabled by this "pre start up" operation. The "pre start up" operation is then followed by an "actual" engine starting, running and stopping cycling operation during which the operator compartment temperature is one of many conditions that enable engine cycling.

In the operation of vehicles there may be many environmental and operational considerations that would limit the use of a complete automatic starting, running and stopping system for the control of the main engine for temperature control of the operator compartment. There is a need in the art for an ability to retain operator participation while controlling operator compartment temperature during sleeping periods.

DISCLOSURE OF THE INVENTION

The invention provides a control system for the use of the main engine of a vehicle as an energy source in maintaining the temperature of an operator compartment. The system is manually enabled subject to multiple criteria, the temperature in the operator compartment is monitored, signals of a desired temperature within a comfort range of about plus or minus 5 degrees are produced. The main engine of the vehicle is enabled in starting and running by all standard safety features and with a fuel flow controlled idle power output, so that cycling through the starting and stopping of the engine is accomplished in response only to the temperature monitor signals. Disconnect of the operator compartment temperature control system is accomplished manually by the operator, usually by actuating the manual operator controls. The invention provides the added safety features of: focused operator attention at enablement and engine fuel flow at idling rate; the added control features of system hysteresis through the use of a temperature range to prevent over regulation and operator participation in enablement and disconnect; and any added idling is only that needed for operator compartment temperature maintenance.

BRIEF DESCRIPTION OF THE DRAWINGS

FIG. 1 is a diagram of the features involved in the principles of a preferred embodiment of the invention.

FIG. 2 is an embodiment diagram of the elements of a preferred embodiment of the invention as implemented in a timed idle engine control system.

BEST MODE FOR CARRYING OUT THE INVENTION

This invention is a technique of controlling a main engine in a vehicle to serve as an energy source for maintaining a comfortable temperature in the operator compartment of the vehicle while the vehicle is not moving and the operator may be sleeping. The invention provides features located in the operator compartment that interact with features in a main engine control unit that cause starting and stopping of the main engine in response to a set range of temperature changes in the operator compartment. In the preferred embodiment the actual heating and cooling for the operator compartment is supplied by standard in the art heating and cooling systems, not shown, that use the main engine as an energy source. The system of the invention uses standard components in the art and on occasion provides additional uses for existing componentry.

Referring to FIG. 1 a diagram is provided showing the essential features of a preferred embodiment of the invention that are located in the operator compartment 1 and in the main engine control unit 2 for controlling the main engine 3.

In FIG. 1 in the operator compartment 1 there is provided a multiple criteria enablement acceptance indicator 4 which permits enablement of the system of the invention on satisfying more than a single condition. The indicator 4 imparts to the system of the invention a high probability of operator attention focus at the time of enablement and thus guards against inadvertent enablement. The multiple criteria could, for example be, a time dependent, visual indication.

A manual enabler 5 is provided to communicate an enablement decision through communication channel 6 into the main engine control unit 2. The enabler 5 communication can also include an indication of the heater or air conditioner being on.

An operator compartment temperature monitor 7 is provided that communicates signals through channel 6 into the main engine control unit 2 indicative of the operator compartment 1 temperature.

Termination of the control of the main engine 3 by the system of the invention, as would occur when normal vehicle operation resumes, is effected by the providing of a manual disconnect capability 8. Since the operator compartment 1 is usually equipped with a manual override of many automatic systems by manipulation of the manual controls, such as when the operator resumes vehicle movement, such manual control manipulation is useable to perform the function of element 8.

Referring next to the main engine control unit 2 of FIG. 1 wherein there is located the signal processing of the operational safety criteria, the engine operation criteria, engine idle control and the signals involving the operator compartment temperature. In a feature 9 there is provided a signal capability, that provides in response to the temperature monitor 7, signals in the form of a design temperature within a selectable comfort range. For example a ten degree range between 55 and 65. The automatic start up and shut down of a large power plant such as the main engine 3 is regulated better where a range is employed than through the use of a specific set point.

In a feature 10 there is provided the vehicle motion safety criteria that in combination insure that the vehicle is inhibited from any movement while the main engine 3 is being cycled between start up and shut down during use of the operator compartment temperature maintenance system of the invention. The motion safety criteria include the standard in the art automatic engine operation requirements such as ignition on, hood closed, neutral transmission setting, no vehicle speed and service or parking brake set; and also include a fuel flow monitor of engine load set to limit engine fuel flow to that of a minimum reliable idle rate. The criteria are provided through sensors or measurers that provide a signal in the main engine control unit 2 that would inhibit a starting signal, or produce a shut down signal, transmitted to the main engine 3 through communication channel 11, when not satisfied.

In a feature 12 there is signal processing for the engine operation criteria that are standard in the art for automatic engine operation requirements such as oil and coolant conditions. The signal sources are usually measurement units or set point sensors in the main engine 3 with the information being communicated between the main engine 3 and the main engine control unit 2 through the communication channel 11. A failure to satisfy an engine operation criterion will result in a signal in the main engine control unit 2 that would inhibit a starting signal or produce a shut down signal from being transmitted to the main engine 3 through communication channel 11.

In operating the system of the invention, the operator must first wait until the multiple criteria enablement indicator indicates that a signal enabling the system will be accepted and then perform a manual turn on. The system monitors the temperature in the operator compartment. When the operator compartment heater is on the control system of the invention starts the main engine when the operator compartment temperature falls below the low temperature limit, continues the running of the main engine at the controlled idle rate as the operator compartment temperature passes through the comfort range and shuts down the main engine when the operator compartment temperature is above the high temperature limit. When the operator compartment cooler is on the control system of the invention starts the main engine when the operator compartment temperature reaches the high limit of the range and continues the running until the cooler brings the operator compartment down to a center set point or the lower limit of the range.

When the operator is ready to resume manual operation of the vehicle, a manual disconnect of the system of the invention is performed, usually by manipulating a manual control such as the clutch, which as is standard in the art, is usually equipped to override or bypass any automatic system.

The system of the invention keeps operator participation at a maximum, minimizes inadvertent turning on of the system, prevents rapid cycling of the main engine in maintaining the operator compartment temperature and uses a minimum of added idling time for that purpose.

It will be apparent that there will be some flexibility in implementation of the invention. The description is oriented toward communication of the concepts involved. It is desired in general to use standard components and some components may alter the location of features. Considering as an illustration the temperature monitoring. A thermometer with a signal output will perform the function of feature 7 and collect the temperature information in the operator compartment.

The invention is further illustrated in connection with FIG. 2 in an embodiment of a main engine control system that employs a settable timing device for main engine idle and uses a signal of "90 seconds to shut down" from that timing device together with a blinking of one of the operator compartment operational indicator lights such as a "warning lamp", as a multiple criteria enablement time window acceptance indicator.

Referring to FIG. 2, wherein like reference numerals are used where appropriate, in the operator compartment 1, the functions of the multiple criteria enablement acceptance indication are achieved by a time based "90 second to shutdown" blinking light signal labelled element 15. In the main engine control unit 2, a settable idle timing device standard in the art is provided that can be set, usually independent of the operator, to cycle the engine between start up and shut down with selectable idling duration periods. Such settable idle timing devices are used in the art for such purposes as preventing long idle periods while making deliveries and lunch breaks. In accordance with the invention such a timing device is modified as element 16 to provide an intermittent signal in the 90 seconds before the timer shuts down the engine in a cycle. The time based intermittent signal is communicated to the operator compartment 1 through communication channel 17 to produce a blinking light signal in the instrument panel. The blinking 90 second to shut down light signal performs the function of element 4 of FIG. 1. The operator compartment 1 is equipped with an enabler 18 that communicates with element 2 through communication channel 19 and performs the function of element 5 of FIG. 1. The system of the invention, when enabled, bypasses the timer 16 and permits cycling of the main engine in response to temperature signals from the operator compartment 1 temperature indicator 20, communicated through communication channel 21, and converted in element 22 to designed temperature plus or minus control range signals.

Under such control: with the heater on, a low temperature signal will permit the main engine to keep running if it is running and will start the main engine if it is not running; and a high temperature signal will shut off the main engine if it is running and will prevent starting the main engine if it is not running; and with the cooler or air conditioner on, a high temperature signal will start the main engine if not running or continue running if it is running and a lower temperature signal at a mid range or lower extreme range will shut down the engine.

In a section labelled 23 the safety criteria involving inhibiting vehicle motion are introduced into the main engine control unit 2. A group of switches 24, 25, 26 and 27 are connected in series, for respectively ignition, hood down, service brake applied and transmission in neutral, criteria any one of which being open inhibits a common signal to the control unit 2. Provision is made in the main engine controller 2 for a fuel flow monitoring function 28, standard in the art, that provides an inhibit signal to the main engine controller 2 if there is a departure from a designed idling fuel flow rate. Still further in section 23, there is a standard in the art vehicle speed indicator 29, set to provide an inhibit signal to the main engine controller 2 for any indication other than zero.

In a section 30 there are bypass and override elements 31, 32 and 33 that respectively provide bypass signals to the main engine control unit 2 when the clutch, the service brake and the throttle are actuated. The signal from element 31 performs the disconnect function of element 8 in FIG. 1.

The engine start up and shut down signals and the measured engine operation criteria are communicated between the main engine controller 2 and the main engine 3 in communication channel 34.

What has been described is the technology of using the main engine of a vehicle as an energy source in maintaining the temperature of an operator compartment where the main engine starting and shut off is responsive only to operator compartment temperature signals.

We claim:

1. Apparatus for control of the combination, of an operator compartment, a main engine control unit and a main engine, of a vehicle, for service by said main engine as an energy supply in maintaining a comfortable temperature in said operator compartment of said vehicle comprising in combination:

enablement means for said apparatus, located in said operator compartment and adapted for communication with said main engine control unit, said enablement means including, a multi criteria enablement acceptance indicator, and, an operator actuated enabler, means monitoring the temperature in said operator compartment and delivering signals from said monitoring of the temperature of said operator compartment to said main engine control unit, disconnect means located in said operator compartment and adapted for an operator to disconnect said apparatus, signal processing means located in said engine control unit, said signal processing means being responsive to signals indicating, absence of vehicle motion, and, main engine operation condition signals measured at and communicated from said main engine, and, said signal processing means, responsive to signals from said means monitoring the temperature in said operator compartment, being adapted to provide signals representative of a designed temperature within a plus or minus control range, with high and low temperature signals being at the extremes of said control range being adapted to produce start and stop signals and communicated to said main engine.

2. The control apparatus of claim 1 wherein said control range is ten degrees.

3. The control apparatus of claim 1 wherein said enablement acceptance indicator is a time based light.

4. The control apparatus of claim 1 wherein said signals indicating absence of vehicle motion includes an idling rate fuel flow.

5. The control apparatus of claim 4 wherein said enablement acceptance indicator is a time based light.

6. The control apparatus of claim 5 wherein said main engine control unit includes an idle duration time device and said signal processing of said signals from said monitoring of the temperature of said operator compartment is adapted to interrupt said idle duration time device in producing said start and stop signals.

7. The control apparatus of claim 6 wherein said signals indicating absence of vehicle motion includes an idling rate fuel flow.

8. The control apparatus of claim 7 wherein said enablement acceptance indicator is a time based light.

9. The control apparatus of claim 8 wherein said control range is ten degrees.

10. A control apparatus for maintaining a comfort range temperature in the operator compartment of a vehicle having a main engine responsive to a main engine control unit, said operator compartment having, temperature sensing means, a multiple criteria enablement acceptance indicator, enablement actuation means, disconnect means for the operator to disconnect said control apparatus, and, signal communication means between said operator compartment and said main engine control unit, said main engine control unit having, means detecting absence of vehicle motion, and, satisfactory engine operation condition signals, and, means responsive to said temperature sensing means adapted to provide signals representative of a designed temperature within a plus or minus control range, with high and low temperature signals at the extremes of said control range being adapted to produce start and stop signals communicated to said main engine.

11. The control apparatus of claim 10 wherein said main engine control unit includes an idle duration time device and said signal processing of said signals from said monitoring of the temperature of said operator compartment is adapted to interrupt said idle duration time device in producing said start and stop signals.

12. The control apparatus of claim 11 wherein said signals indicating absence of vehicle motion includes an idling rate fuel flow.

13. The control apparatus of claim 12 wherein said enablement acceptance indicator is a time based light.

14. The control apparatus of claim 13 wherein said control range is ten degrees.

* * * * *